United States Patent
Oh et al.

(10) Patent No.: US 12,443,480 B2
(45) Date of Patent: Oct. 14, 2025

(54) METHOD FOR REPAIRING NULL POINTER EXCEPTION

(71) Applicant: Korea University Research and Business Foundation, Seoul (KR)

(72) Inventors: Hakjoo Oh, Seoul (KR); Junhee Lee, Seoul (KR); Seongjoon Hong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 63 days.

(21) Appl. No.: 18/517,107

(22) Filed: Nov. 22, 2023

(65) Prior Publication Data

US 2024/0176691 A1 May 30, 2024

(30) Foreign Application Priority Data

Nov. 24, 2022 (KR) .................. 10-2022-0158875

(51) Int. Cl.
*G06F 11/00* (2006.01)
*G06F 11/07* (2006.01)
*G06F 11/3698* (2025.01)

(52) U.S. Cl.
CPC ...... *G06F 11/0793* (2013.01); *G06F 11/3698* (2025.01)

(58) Field of Classification Search
CPC .................. G06F 11/0793; G06F 11/3698
See application file for complete search history.

(56) References Cited

U.S. PATENT DOCUMENTS

| 11,593,675 | B1* | 2/2023 | Garg | G06F 21/54 |
| 2006/0005169 | A1* | 1/2006 | Berstis | G06F 11/366 717/125 |
| 2014/0380283 | A1* | 12/2014 | Hu | G06F 11/3636 717/132 |
| 2015/0095707 | A1* | 4/2015 | Huang | H04L 67/10 714/37 |
| 2017/0212826 | A1* | 7/2017 | Chandra | G06F 11/362 |
| 2017/0308456 | A1* | 10/2017 | Barsness | G06F 11/3612 |
| 2017/0308457 | A1* | 10/2017 | Barsness | G06F 11/3616 |
| 2017/0329694 | A1 | 11/2017 | Yoon et al. | |

(Continued)

FOREIGN PATENT DOCUMENTS

| CN | 114385509 A | 4/2022 |
| CN | 114398278 A | 4/2022 |

(Continued)

OTHER PUBLICATIONS

Gulwani, Sumit, et al., "Automated Clustering and Program Repair for Introductory Programming Assignments," ACM SIGPLAN Notices, Jun. 18-22, 2018, (p. 465-480).

(Continued)

*Primary Examiner* — Joshua P Lottich
(74) *Attorney, Agent, or Firm* — NSIP Law

(57) ABSTRACT

Disclosed is a method for repairing a null pointer exception performed by a computing device including a processor, which includes: obtaining an original program; and obtaining, by using a classification model, a patch program from the original program by repairing an error of the original program; and, in which the classification model may be trained in advance by using a null processing pattern dataset obtained from at least one program.

10 Claims, 5 Drawing Sheets

(56) References Cited

U.S. PATENT DOCUMENTS

| | | | |
|---|---|---|---|
| 2019/0361790 A1 | 11/2019 | Oh et al. | |
| 2020/0104110 A1* | 4/2020 | Singh | G06F 11/1433 |
| 2020/0409819 A1* | 12/2020 | Acharyya | G06F 11/0793 |
| 2021/0141907 A1 | 5/2021 | Kim et al. | |
| 2022/0179731 A1 | 6/2022 | Jung et al. | |

FOREIGN PATENT DOCUMENTS

| | | |
|---|---|---|
| KR | 10-2013-0077673 A | 7/2013 |
| KR | 10-1694783 B1 | 1/2017 |
| KR | 10-2019-0134336 A | 12/2019 |
| KR | 10-2209151 B1 | 1/2021 |
| KR | 10-2022-0080311 A | 6/2022 |

OTHER PUBLICATIONS

White, Martin, et al., "Sorting and Transforming Program Repair Ingredients Via Deep Learning Code Similarities," arXiv:1707.04742v2, Dec. 31, 2018, (12 Pages in English).

Lee, Won-Kyung, et al., "Application of Machine Learning Techniques for The Classification of Source Code Vulnerability," Journal of the Korea Institute of Information Security & Cryptology, vol. 30, No. 4, Aug. 2020, (p. 735-743).

Dong, Yukun, et al., "Automatic Repair Method for Null Pointer Dereferences Guided by Program Dependency Graph," Symmetry, Jul. 28, 2022, (19 Pages in English).

\* cited by examiner

[Fig.1]
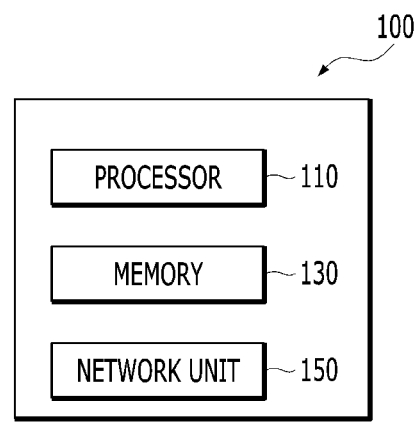
[Fig.2]
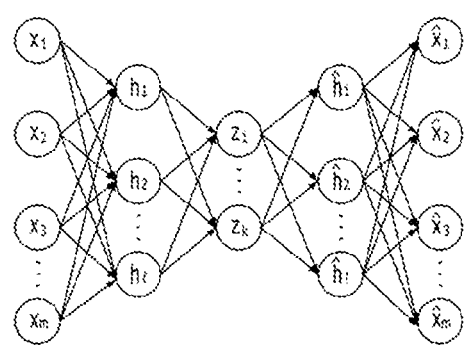

[Fig.3]
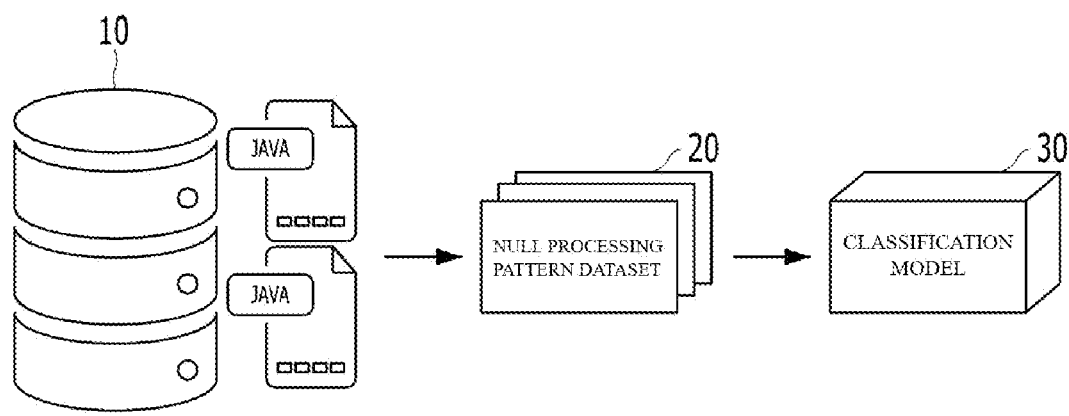

[Fig.4]
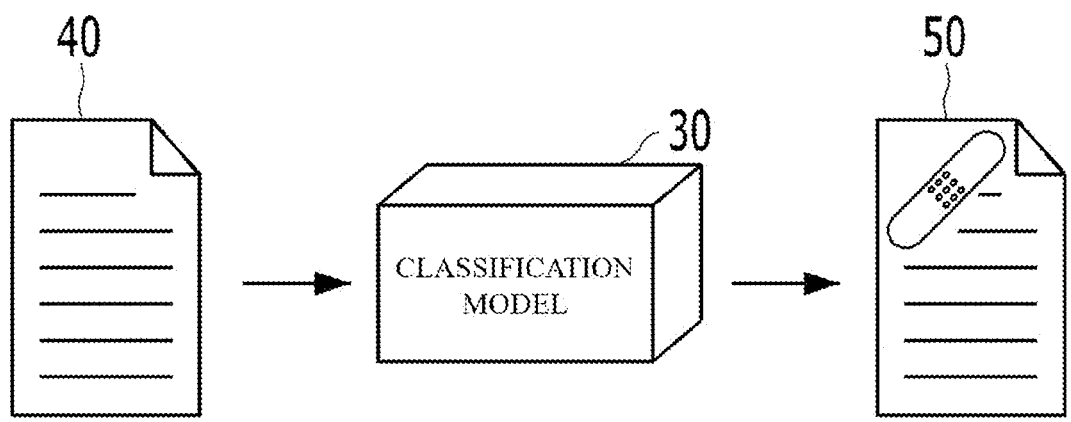

[Fig.5]
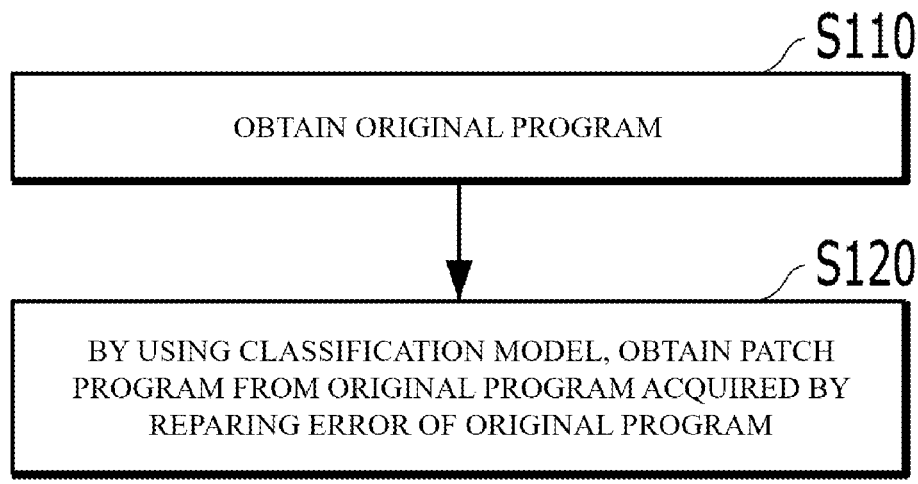

[Fig.6]
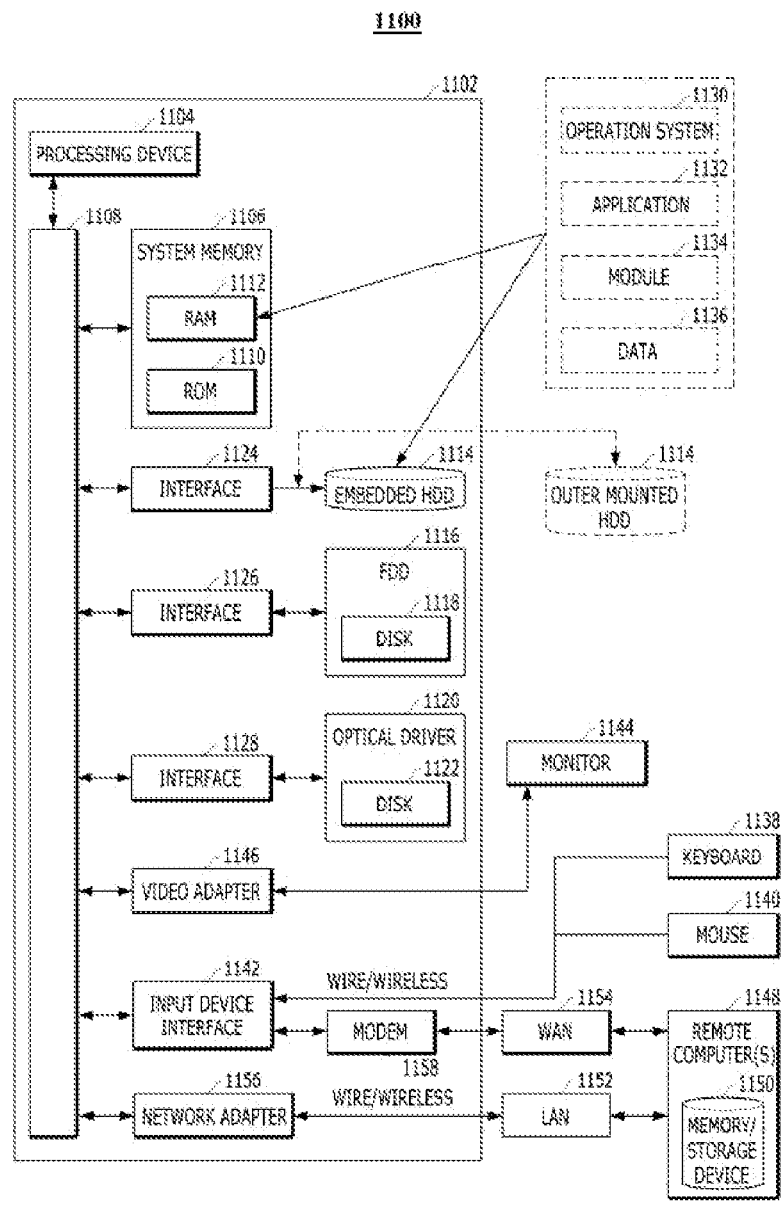

METHOD FOR REPAIRING NULL POINTER EXCEPTION

CROSS-REFERENCE TO RELATED APPLICATIONS

This application claims priority to and the benefit of Korean Patent Application No. 10-2022-0158875 filed in the Korean Intellectual Property Office on Nov. 24, 2022, the entire contents of which are incorporated herein by reference.

TECHNICAL FIELD

The present disclosure relates to a method for repairing a null pointer exception, and more particularly, to a method for repairing a null pointer exception by using a classification model without a testcase.

BACKGROUND ART

In general, a null pointer exception may occur when referring to a null pointer. The null pointer exception can be a very deadly error because the null pointer exception causes program crash (abnormal termination) if appropriate exception processing is not achieved. A program automatic repairing technology can be used to repair the null pointer exception.

The program automatic repairing technology receives an original program with an error and a condition in which the error is to be repaired, as an input to automatically generate a program in which the error disappears. A program repairing edition which removes the error of the original program can be called a patch.

The program automatic repairing technology can be variously classified according to an error to be repaired, a patch generation scheme, a scheme of validating whether the patch satisfies an error repairing condition, etc. Most of the technologies developed in the last 10 years can be a generate and validate scheme.

The generate and validate scheme can be a scheme of repeating two processes, i.e., generating a patch code (patch generation) and validating a program adopting the patch (patch validation). In a patch code generation step, a candidate patch can be selected in a predefined search space. Thereafter, in a patch validating step, a testcase given as an input is executed the program adopting the patch to inspect whether the corresponding patch is correct. In the generate and validate scheme, such a process can be repeated until a patch passing through the testcase is discovered.

However, in the generate and validate scheme, the patch validation process entirely relies on the testcase. The testcase may be a kind of program specification in which an input of the program and a preferable output value for the input are created by using an assertion. In general, the testcase does not exist at the time of discovering the error. Therefore, the testcase is created for post-validation in the process of discovering the error and repairing the discovered error by a developer. Further, the testcase may not describe a sufficient specification. In this case, a wrong patch can be generated, which performs a motion which fits only for a specific input due to a testcase bias problem.

SUMMARY OF THE INVENTION

The present disclosure is contrived in response to the background art, and has been made in an effort to provide a method for repairing a null pointer exception by using a classification model without a testcase.

Technical objects of the present disclosure are not restricted to the technical object mentioned as above. Other unmentioned technical objects will be apparently appreciated by those skilled in the art by referencing to the following description.

In order to achieve the object, an exemplary embodiment of the present disclosure provides a method for repairing a null pointer exception performed by a computing device including a processor, which includes: obtaining an original program; and obtaining, by using a classification model, a patch program from the original program acquired by repairing an error of the original program, in which the classification model may be trained in advance by using a null processing pattern dataset obtained from at least one program.

Alternatively, the null processing pattern dataset may include a first program included in at least one program, a first feature vector converting a first NPE occurrence expression causing the null pointer exception in the first program into a vector, and a first specialization replacement expression used instead of the first NPE occurrence expression in order to prevent the occurrence of the null pointer exception.

Alternatively, the first specialization replacement expression may be obtained from a first abstract replacement expression by using the specialization function of specializing the type of expression to correspond to the classification model.

Alternatively, the first abstract replacement expression may be obtained from a first original replacement expression including at least one information regarding the first program and the replacement expression preventing the occurrence of the null pointer exception by using the abstract function abstracting at least one information regarding the first program.

Alternatively, the first feature vector may be decided based on at least one of a method name, a method body, or a context related to the first NPE occurrence expression.

Alternatively, the null pointer exception may be a bug that may cause forced termination of the program by referring to the null pointer which is a pointer indicating that there is no data element to be referred to.

Alternatively, the classification model may be trained in advance through deep learning or machine learning by using the null processing pattern dataset in order to obtain the replacement expression replacing the NPE occurrence expression causing the null pointer exception included in the input program.

Alternatively, the method may further include performing a validation of the patch program by comparing the original program and the patch program.

Alternatively, another exemplary embodiment of the present disclosure provides a computer program stored in a computer-readable storage medium, in which the computer program comprises instructions for causing a processor of a computing device for repairing a null pointer exception to perform the following steps, and the steps may include: obtaining an original program; and obtaining, by using a classification model, a patch program from the original program by repairing an error of the original program, and the classification model may be trained in advance by using a null processing pattern dataset obtained from at least one program.

Alternatively, yet another exemplary embodiment of the present disclosure provides a computing device for repairing a null pointer exception, which includes: a processor including at least one core; a memory for storing computer programs executable by the processor; and a network unit, in which the processor may be configured to obtain an original program, and obtain, by using a classification model, a patch program from the original program by repairing an error of the original program and the classification model may be trained in advance by using a null processing pattern dataset obtained from at least one program.

According to an exemplary embodiment of the present disclosure, the null pointer exception can be repaired by using the classification model without the testcase.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIG. 1 is a diagram illustrating a computing device for repairing a null pointer exception according to some exemplary embodiments of the present disclosure.

FIG. 2 is a schematic view illustrating a network function according to some exemplary embodiments of the present disclosure.

FIG. 3 is a diagram for describing a training process of a classification model performed by the computing device for repairing a null pointer exception according to some exemplary embodiments of the present disclosure.

FIG. 4 is a diagram for describing a patch program creation process using the classification model performed by the computing device for repairing a null pointer exception according to some exemplary embodiments of the present disclosure.

FIG. 5 is a diagram for describing a method for repairing a null pointer exception performed by the computing device according to some exemplary embodiments of the present disclosure.

FIG. 6 illustrates a simple and general schematic view of an exemplary computing environment in which the exemplary embodiments of the present disclosure may be implemented.

DETAILED DESCRIPTION

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive replacements. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each specific application. However, such implementation decisions should not be interpreted as causing a departure from the scope of the present disclosure.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a diagram illustrating a computing device for repairing a null pointer exception (NPE) according to some exemplary embodiments of the present disclosure.

A configuration of the computing device 100 illustrated in FIG. 1 is only an example shown through simplification. In an exemplary embodiment of the present disclosure, the computing device 100 may include other components for performing a computing configuration of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 or any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

In respect to the network unit 150 according to an exemplary embodiment of the present disclosure, an arbitrary wired/wireless communication network that may transmit/receive arbitrary type data and signals may be included in the network expressed in the present disclosure.

The techniques described in this specification may also be used in other networks in addition to the aforementioned networks.

In the present disclosure a program (e.g., an original program, a patch program, etc.) may be a file including data related to a language which may be recognized by the computing device. For example, the program may be a Java program. In the present disclosure, for convenience of description, the present disclosure may be described by assuming that the program is the Java program. However, the type of program is not limited thereto and may include various types of programs.

In the present disclosure, the Java program (P∈Pgm) may include a declaration of at least one class. For example, the Java program (P∈Pgm) may be constituted by the declaration of at least one class.

The class may include at least one field and/or method.

The field may mean a variable included in the class.

The method may be a single request message which is created to perform a specific operation and perform a request service. For example, the method may include a function associated with the class and an object.

In the Java program, it is very rare that the null pointer exception occurs by directly accessing a public field. Therefore, in the present disclosure, an expression which refers to a member variable may not be considered in the language. The member variable may be a variable declared outside the method.

The declaration of at least one class may include a class name and/or a method declaration. For example, the declaration of at least one class may configure a name of at least one class and a declaration of at least one method as a pair.

The class may be to define a model of the object which summarizes data and a method which is a manipulation procedure in an object-oriented programming. The object-oriented programming (OOP) may be a programming which treats all data as the object, and embodies a state and a behavior of the object.

The name of the class may be a name which may represent the object included in the class. The name of the class may be a name for calling the class.

The declaration of the method may include at least one the type of return value, the name of the method, a parameter, and/or a body (e.g., a statement) of the method.

The type of return value may be the type of returned data when a task through the method is completed.

The name of the method may be a name for calling the method.

The parameter may be a variable used for transferring an argument transferred in a definition of the function to the function included in the method at the time of calling the method. The argument may be a value substituted into the function included in the method.

The body of the method may be a set of statements that perform a unique function of the function.

In the present disclosure, in the case of the body of the method, only the statement S and the expression E may be considered for convenience of description. The statement S and the expression E may be as follows.

$$S \rightarrow x=e \mid \text{return } e \mid \text{if } ES_1S_2 \mid \text{while } ES \mid S_1;S_2 \mid \epsilon$$

$$E \rightarrow n \mid \text{null} \mid x \mid x \cdot m(y) \mid \text{new} C(\ ) \mid E_1?E_2:E_3 \mid E_1==E_2$$

The type for an expression e may be written as type(e). A body of a while statement may include break and continue statements which are flow control syntaxes. A variable may be a local variable or a this reference variable. The local variable may be a variable which is declared in the function and is usable only in the corresponding function. This reference variable may be a variable used when an instance refers to itself. The instance may be the object included in the class.

A set of expressions in which the null pointer exception can occur may be written as $E_{NPE}$. That is, in the present disclosure, $E_{NPE}$ may be a set of method calling equations x·m(y) in which x is a null pointer. The null pointer exception may be a bug that may cause forced termination of the program by referring to the null pointer which is a pointer indicating that there is not data element to be referred to.

The processor 110 may obtain a null processing pattern dataset ($D \subseteq Pgm \times E_{NPE} \times E$) from at least one program. At least one program ($P=\{P_1, P_2, \ldots, Pm\}$, m is a natural number) may be stored in a memory 130 in advance according to an exemplary embodiment. At least one program may be received from an external device according to another exemplary embodiment. The external device as a different device from the computing device 100 may transmit at least one program to the computing device 100.

The null processing pattern dataset may be a set of tuples (e.g., (P, $e_{NPE}$, e), etc.). That is, the processor 110 collects data regarding avoidance of the null pointer exception in the program to obtain the null processing pattern dataset.

P may be one specific program (e.g., a first program, etc.) among at least one program. $e_{NPE}$ may be a null pointer exception (NPE) occurrence expression (e.g., a first NPE occurrence expression, etc.) included in P. e may be a replacement expression preventing the null pointer exception which occurs through the NPE occurrence expression included in P and/or an original replacement expression (e.g., a first original replacement expression, etc.) including at least one information regarding the program P. At least one information regarding the program as information which depends on the program may include, for example, a name of the local variable included in the program, a user-definition class, etc.

The processor 110 may obtain a null processing pattern in an abstract syntax tree (AST) included in at least one program. The processor 110 may generate the null processing pattern dataset based on the collected tuples regarding the null processing pattern.

For example, the processor 110 may obtain a tuple (P, x·m(y), e) in a ternary operational equation x==null?e: x·m(y) included in the abstract syntax tree included in at least one program. The tuple (P, x·m(y), e) may mean that the original replacement expression e is used instead of method calling because the null pointer exception occurs when x is null at the time of calling x·m(y). As another example, the processor 110 is also capable of collecting the replacement expression as different distinguishable equations. For example, the processor 110 may obtain a tuple (P, x·m(y), true) because x==null∥x·m(y) included in the abstract syntax tree included in at least one program has the same as x==null?true: x·m(y). The abstract syntax tree as a subset of a derivation tree may be a tree abstracted to have a node for a meaningful terminal symbol or generation rule.

The processor 110 may perform generalization of changing the original replacement expression to the abstract replacement expression. The processor 110 may obtain the null processing pattern dataset ($D\hat{} \subseteq Pgm \times E_{NPE} \times \hat{E}$) by performing the generalization. $\hat{E}$ may mean a set of the abstract replacement expressions as follows.

$$\hat{E} \triangleq \mathbb{N}_D \cup \{null, ARG, NEW\} \cup \{ARG == \hat{e} \mid \hat{e} \in \mathbb{N}_D \cup \{null\}\} \cup \{\tau\}$$

$\mathbb{N}_D$ may mean integers which appear in the dataset at a predetermined number of times (e.g., 10 times) or more. $\mathbb{N}_D$ may mean integers determined based on an appearance frequency in the dataset. For example, $\mathbb{N}_D$ may mean three integers $\{-1, 0, 1\}$ having a highest appearance frequency. The processor 110 may determine a name of a method factor as ARG without distinguishing the name of the method factor in the abstract replacement expression. The processor 110 may determine a generator expression new C( ) as NEW except for user definition class information. The processor 110 may determine a same value comparison operational equation $E_1==E_2$ as ARG==ê when $E_1$ is generalized to the method factor ARG and E is expressed as one literal like $\mathbb{N}_D$ or null. The processor 110 may determine an expression other than the above-described case as τ. An abstract function α abstracting the original replacement expression may be configured as follows.

$$\alpha(e_{NPE}, e) = \begin{cases} e & \ldots \ e \in \mathbb{N}_D \cup \{null\} \\ NEW & \ldots \ e = new\,C() \\ ARG & \ldots \ e_{NPE} = x.m(y) \land e = y \\ ARG == n & \ldots \ e_{NPE} = x.m(y) \land e = (y == n) \land n \in \mathbb{N}_D \cup \{null\} \\ \tau & \ldots \ \text{otherwise} \end{cases}$$

The processor 110 may obtain the abstract replacement expression from the original replacement expression by using the abstract function α. That is, the processor 110 may obtain the generalized dataset $D\hat{}=\{P, e_{NPE}, \alpha(e_{NPE}, e) \mid (P, e_{NPE}, e) \in D\}$ by using the abstract function α.

For example, the processor 110 may obtain an abstract replacement expression from the original replacement expression including at least one information regarding the program and the replacement expression preventing the occurrence of the null pointer exception by using an abstract function abstracting at least one information regarding the program. That is, the abstract replacement expression may be obtained from the original replacement expression including at least one information regarding the program and the replacement expression preventing the occurrence of the null pointer exception by using the abstract function abstracting at least one information regarding the program.

According to some exemplary embodiments of the present disclosure, the processor 110 may obtain the abstract replacement expression finitely abstracting the original replacement expression by using the abstract function when the original replacement expression is infinitely expressed.

The processor 110 may perform a feature representation representing the NPE occurrence expression $e_{NPE}$ by a feature vector in order to configure a training dataset $\mathcal{D} \subseteq (0, 1)^n \times \hat{E}$ (n is the natural number) to be used for training the classification model. The training data set may be included in the null processing pattern dataset. The feature vector may be a vector generated based on at least one feature. That is, the processor 110 may generate the feature vector based on at least one feature.

For example, the processor 110 may generate n Boolean features $\Phi=\{\varphi_1, \varphi_2, \ldots \varphi_n\}$ (n is the natural number). $\varphi_j$: $Pgm \times E_{NPE} \rightarrow \{0, 1\}$ (i is any one number of 1 to n) which is one the Boolean features as a predicate for the pair of the program and the NPE occurrence expression may include features of the NPE occurrence expression and a neighboring code context. For example, $\varphi_j$: $Pgm \times E_{NPE} = \{0, 1\}$ (i is any one number of 1 to n) may include the predicate (for example, "which NPE occurrence expression belongs to a try catch syntax block").

The processor 110 may configure the training dataset $\mathcal{D} \subseteq \{0, 1\}^n \times \hat{E}$ (n is the natural number) based on n Boolean features $\Phi=\{\varphi_1, \varphi_2, \ldots \varphi_n\}$ (n is the natural number). The processor 110 may be configured the training data set $\mathcal{D}$ as follows.

$$\mathcal{D} = \{(\Phi(P,e_{NPE}),\hat{e}) | (P,e_{NPE},e) \in D^{\hat{}}\}$$

$\Phi(P, e_{NPE})$ may be a feature vector for $(P, e_{NPE})$. That is, $\Phi(P, e_{NPE})$ may be $<\varphi_1, (P, e_{NPE}), \varphi_2(P, e_{NPE}), \ldots, \varphi_n(P, e_{NPE})>$.

The processor 110 may define 31 features as in Table 1 below.

TABLE 1

| Class | # | Description |
|---|---|---|
| Name Features | 1-20 | 1."Code", 2."hash", 3."append", 4."equals", 5."on", 6."Error", 7."Success", 8."get", 9."set", 10."is", 11."add". 12."close", 13."Empty", 14."Value", 15."put" 16."String", 17."to", 18."remove", 19."write", 20."contains" |
| Body Features | 21 | return type is void |
| | 22 | method returns a literal |
| | 23 | thrown exceptions are annotated |
| | 24 | null check expression exists |
| | 25 | method returns a constructor call |
| | 26 | method is the base of another invocation |
| | 27 | method returns a field |
| Context Features | 28 | caller method is private |
| | 29 | null pointer is assigned to an array |
| | 30 | null pointer is assigned to a field |
| | 31 | null pointer is assigned to a public field |

In the present disclosure, $E_{NPE}$ may be a set of method calls x·m(y). The feature (e.g., the Boolean feature, etc.) may be the predicate for the method call x·m(y). The feature may include at least one of name features of the method, body features of the method, and/or context features.

The name features of the method may be a feature indicating which keyword appears in the called method name. For example, the processor 110 may determine the keyword as name features of a predetermined number (e.g., 20, etc.). Specifically, the processor 110 may obtain the keyword from names of all methods included in at least one program. For example, the processor 110 may classify the names of all methods based on a predetermined representation method (e.g., a camel case representation method, etc.), and determine keywords of a predetermined number (e.g., 20, etc.) based on the appearance frequency.

The body features of the method may be features for distinguishing whether each body have a part of a specific abstract syntax tree (AST). The processor 110 may distinguish the type of called method based on the name features of the method and the body features of the method. For example, the processor 110 may guess that the method is a getter method through a combination of feature #8 and feature #27 of Table 1.

The context feature may include the neighboring code context of the NPE occurrence expression.

The processor 110 may train the classification model (e.g., a probabilistic multi-label classifier, etc.) by using the training dataset $\mathcal{D}$ in order to train a probabilistic distribution for the set $\hat{E}$ of the abstract replacement expressions.

According to an exemplary embodiment of the present disclosure, the classification model may be trained in advance through deep learning or machine learning by using the null processing pattern dataset including the training dataset in order to obtain the replacement expression replacing the NPE occurrence expression causing the null pointer exception included in the input program.

For example, the classification model may include a decision classifier that obtains the replacement expression replacing the NPE occurrence expression causing the null pointer exception included in the input program. The decision classifier may include a model that shows patterns which exist between data by analyzing the data by a combination of predictable rules. The decision classifier may include a classification tree in which a target variable is a discrete value and/or a regression classifier in which the target variable is a continuous real value. The decision tree may include, for example, a random forest classifier, a gradient boosting classifier, etc. The random forest classifier as a kind of ensemble training method used for classification, regression analysis, etc., may include a tree which operates by outputting classification or regression analysis from multiple decision classifiers configured in a training process. Specifically, the random forest classifier may include a classifier that assigns a weight to each of multiple decision classifiers or performs a final decision through a majority decision method. The gradient boosting classifier is the same as the random forest classifier in terms of outputting the classification or regression analysis from multiple decision classifiers configured in the training process, but may be different from the random forest classifier in that multiple decision classifiers enhance accuracy while being influenced from each other to finally obtain one classifier. Specifically, the gradient boosting classifier defines multiple decision classifiers as a weak learning machine, and a second weak learning machine concentrically classifies data mis-classified by a first weak learning machine, and then combines the first weak learning machine and the second weak learning machine to generate a new learning machine having higher accuracy. A model created through a method for generating a strong learning machine by repeating such a process may be the gradient boosting classifier. The classification model is just an example and the present disclosure is not limited thereto.

The processor 110 may obtain a probabilistic distribution $\Pr(\hat{e}|\Phi(P, e_{NPE}))$ by inputting the training dataset $\mathcal{D}$ into a random forest classifier training algorithm. $\Pr(\hat{e}|\Phi(P, e_{NPE}))$ may be a probability that the abstract replacement expression for the NPE occurrence expression $e_{NPE}$ with be $\hat{e}$. Pr may be a trained probabilistic distribution. P may be the program. $e_{NPE}$ may be the NPE occurrence expression. The abstract replacement expression may be $\hat{e} \in \hat{E}$.

The processor 110 may train the classification model $\mathcal{M}$ based on the probabilistic distribution $\Pr(\hat{e}|\Phi(P, e_{NPE}))$. For example, the processor 110 may obtain a specialization replacement expression from the abstract replacement expression by using a specialization function ($\gamma: E_{NPE} \times \hat{E} \to E \cup \{\bot\}$) of specializing the type of expression to correspond to the classification model. That is, the specialization replacement expression may be obtained from a first abstract replacement expression by using the specialization function of specializing the type of expression to correspond to the classification model.

The processor 110 may define the specialization function ($\gamma: E_{NPE} \times \hat{E} \to E \cup \{\bot\}$) as follows.

$$\gamma(x, m(y), \hat{e}) = \begin{cases} n & \dots \; \hat{e} = n \wedge T = \text{int} \\ \text{null} & \dots \; \hat{e} = \text{null} \wedge T \neq \text{int} \\ \text{new } C() & \dots \; \hat{e} = \text{NEW} \wedge T = C \\ y & \dots \; \hat{e} = \text{ARG} \wedge \text{type}(y) = T \\ y == e & \dots \; \hat{e} = \text{ARG} == e \wedge T = \text{int} \\ \bot & \dots \; \text{otherwise} \end{cases}$$

T may mean the type of method call x·m(y).

The processor 110 may define the classification model $\mathcal{M}$ based on the specialization function $\gamma$ as follows.

$$\mathcal{M}_{P}(e_{NPE}) = \gamma(e_{NPE}, \text{argmax}_{\hat{e} \in C} Pr(\hat{e} | \Phi(P, e_{NPE})))$$

A set ($C = \{\hat{e} \in E^\wedge | (\gamma e_{NPE}, \hat{e}) \neq \bot\}$) may mean a set of expressions which can be specialized by the specialization function $\gamma$, argmax may mean calculating the abstract replacement expression $\hat{e}$ for making the probabilistic distribution $Pr(\hat{e} | \Phi(P, e_{NPE}))$ into a maximum value.

As described above, the null processing pattern dataset may include the training dataset. The training dataset as a dataset for training the classification model may include the program, the feature vector that converts the NPE occurrence expression which causes the null pointer exception into the vector in the program, and the specialization replacement expression used instead of the NPE occurrence expression in order to prevent the occurrence of the null pointer exception.

According to some exemplary embodiments of the present disclosure, the null processing pattern dataset may include a validation dataset. The validation dataset as a dataset for validating the classification model may be used for validating the classification model trained through the training dataset. The validation dataset may include the program, the feature vector that converts the NPE occurrence expression which causes the null pointer exception into the vector in the program, and the specialization replacement expression used instead of the NPE occurrence expression in order to prevent the occurrence of the null pointer exception.

The processor 110 may perform specification inference of obtaining a patch program of repairing an error of an original program from the original program by using the trained classification model.

The processor 110 may obtain an original program (e.g. an error program) $P_{NPE} \in \text{Pgm}$ and $x_{NPE} \cdot m(y)$. $x_{NPE}$ may mean a variable in which a value is null in an execution in which the error occurs. As the error which occurs in the program, only NPE may exist.

The processor 110 may use symbolic execution in order to obtain the patch program. The symbolic execution may be a method for allocating a symbol value to an input variable in a program unit. The processor 110 may convert the NPE occurrence expression $x_{NPE} \cdot m(y)$ into the replacement expression (e.g., specialization replacement expression, etc.) obtained through the classification model in the error program by using the symbolic execution. That is, the processor 110 may perform execution of the error program by using the replacement expression in order to prevent the execution from being terminated due to the occurrence of the NPE in the error program.

According to some exemplary embodiments of the present disclosure, the processor 110 may use an output of the symbolic execution as the execution specification of the input program (e.g., the error program). The output $\Sigma \in \text{SumTable} = \text{Method} \rightarrow \text{Summary}$ of the symbolic execution may be a table showing a summary for each method. The summary of the method may be defined as follows.

$S \in \text{Summary} = \mathcal{P}(\text{State})$ $s \in \text{State} = PC \times \text{Store}$ $\pi \in PC = \mathcal{P}(\text{SymbVal} \times \{=, \neq\} \times \text{SymVal})$ $\sigma \in \text{Store} = \text{Var} \rightarrow \text{SymVal}$ $\upsilon \in \text{SymVal} = \mathbb{Z} + \text{Class} + \{\text{null}\} + \text{Symbol}$ The summary of the method may be a set of program states. The state of the program may be a pair of a path condition PC and a store The path condition may be a set of conditional equations in a branch in the program. The conditional equation of the branch may be constituted by a same value comparison operation between symbolic values or a negation thereof. The store may be a map storing which symbolic value each variable Var has. The symbolic value may include an integer value $\mathbb{Z}$, a class type, null, and a symbol meaning the parameter of the method.

In the present disclosure, the processor 110 may perform the symbolic execution (SymExec: Pgm→SumTable) by defining the symbolic execution (SymExec: Pgm→SumTable) by a scheme of limiting the number of repeated executions with bottom-up for scalability of technology. Therefore, the processor 110 may analyze each method of the program only once. The processor 110 may use a summary of a second method different from a first method, which calls the first method when analyzing each method. The summary of the second method may be calculated before analyzing the first method and stored in the computing device 100. That is, the processor 110 may calculate the summary of the second method and store the calculated summary in the memory 130 before analyzing the first method.

The processor 110 may perform a repetition statement included in the program in advance and repetition of recursive calls at a predefined finite number of times (e.g., 10 times, etc.). For example, the processor 110 may perform the repetition statement included in the program and the repetition of the recursive calls at the predefined finite number of times before analyzing the program. As another example, the processor 110 may perform the repetition statement included in the program and the repetition of the recursive calls at the predefined finite number of times before obtaining the patch program of the program.

The processor 110 may change the name of the method included in the program to be unique. That is, the processor 110 may prevent overriding or overloading of the method. The processor 110 may change the ternary operational equation to an if-conditional clause included in the program. Therefore, the processor 110 may consider only the following statement S and expression E.

$S \rightarrow x := e | \text{return } x | \text{if } (x==y) S_1 S_2 | S_1; S_2$ $E \rightarrow n | \text{null} | x | x \cdot f(y) | \text{new} C( )$ The processor 110 may calculate the summary of the method by bottom-up by using the symbolic execution SymExec. The symbolic execution may be expressed as follows.

$\text{SymExec}(P) = [m_i \mapsto F(\text{body}(m_i), \Sigma^i, s^i_{init})]^n_{i=1}$ Here, $m_1, \ldots, m_n$ may be sorting respective methods in the program reversely to a call order on a method call-graph. $\Sigma^i$ may mean a summary table of the method partially calculated up to $m_1, \ldots, m_{i-1}$. An initial state $s^i_{init}$ may be defined as $(\emptyset, [p_m \mapsto \alpha_{pmi}])$. The initial state $s^i_{init}$ may indicate a state in which a parameter $p_{mi}$ of the method $m_i$ has a symbolic value $\alpha_{pmi}$ which is not used. A semantic function F: Stmt×SumTable×State→$\mathcal{P}$(State) may be defined as follows.

$$F(x:=n,\Sigma,(\pi,\sigma))=\{(\pi,\sigma[x\mapsto n])\}$$

$$F(x:=\text{null},\Sigma,(\pi,\sigma))=\{(\pi,\sigma[x\mapsto \text{null}])\}$$

$$F(x:=y,\Sigma,(\pi,\sigma))=\{(\pi,\sigma[x\mapsto \sigma(y)])\}$$

$$F(x:=\text{new } C(\ ),\Sigma,(\pi,\sigma))=\{(\pi,\sigma[x\mapsto C])\}$$

$$F(x:=y\cdot m(z),\Sigma,(\pi,\sigma))=\{(\pi\cup\pi_m^i,\sigma[x\mapsto\sigma\cup_m^i(\text{ret}_m)])\}_i$$

$$F(S_1;S_2,\Sigma,s)=\cup\{F(S_2,\Sigma,s')|s'\in F(S_1,\Sigma,s)\}$$

$$F(\text{if}(x==y)S_1S_2,\Sigma,(\pi,\sigma))=F(S_1,\Sigma,s_1)\cup F(S_2,\Sigma,s_2)$$

The processor 110 may obtain the patch program of the error program $P_{NPE}$ by using a modified symbolic execution $\text{SymExec}_\mathcal{M}^{x_{NPE}}$. $X_{NPE}$ may mean the NPE occurrence expression (an error repairing target). $\mathcal{M}$ may mean a pre-trained classification model.

The modified symbolic execution $\text{SymExec}_\mathcal{M}^{x_{NPE}}$ may be expressed as follows.

$$\text{SymExec}_\mathcal{M}^{x_{NPE}}=[m_i\mapsto F_\mathcal{M}^{x_{NPE}}(\text{body}(m_i),\Sigma^i,s^i_{init})]^n_{i=1}$$

The processor 110 may extend and define the semantic function in a specific case.

For example, the processor 110 may calculate $F_\mathcal{M}^{x_{NPE}}(\text{body}(m_i), \Sigma^i, s^i_{init})$ as follows when y is $x_{NPE}$ at x:=y·m(z).

$$F(S,\Sigma,(\pi_{nonnull},\sigma))\cup F(x:=\mathcal{M}(y\cdot m(z)),\Sigma,(\pi_{NPE},\sigma))$$

$\pi_{nonnull}$ may be $\pi\cup\{\sigma(x_{NPE})\neq\text{null}\}$. $\pi_{nonnull}$ as a case where y is not null may mean that the symbol execution is made in the same manner as a general symbolic execution.

$\pi_{NPE}$ may be $\pi\cup\{\sigma(N_{NPE})==\text{null}\}$. $\pi_{NPE}$ as a case where y is null may mean that the symbol execution is changed to the replacement expression obtained through the classification model, and made.

As another example, the processor 110 may extend and define the semantic function when y is null, but not the NPE occurrence expression which is the error repairing target (that is, $y\neq N_{NPE}$ and $\sigma(y)==\text{null}\in\pi$). The case where y is null, but not the NPE occurrence expression which is the error repairing target may occur when the classification model returns null (that is, $\mathcal{M}(y\cdot m(z))=\text{null}$). That is, when the replacement expression obtained through the classification model is null, null may be propagated by a subsequent execution. In this case, new NPE may occur. In this case, the processor 110 may apply the semantic function to the classification model again as follows.

$$F_\mathcal{M}^{x_{NPE}}(S,\Sigma,(\pi,\sigma))=F(x:=\mathcal{M}(y\cdot m(z)),\Sigma,(\pi,\sigma))$$

The processor 110 compares the original program and the patch program to validate the patch program. That is, the processor 110 may perform specification validation.

For example, the processor 110 may decide whether the method summary tables of the original program and the patch program match each other.

$$\text{SymExec}_\mathcal{M}^{x_{NPE}}(P_{NPE})=\text{SymExec}(P_{cand})$$

$P_{NPE}$ may be the original program (e.g., the error program). $P_{cand}$ may be the patch program. A left term may mean an error repairing specification inferred by using the classification model from the original program (e.g., the error program). The processor 110 may determine that the method summary table of the original program and the method summary table of the patch program match each other when the following condition is established for all methods.

$$\bigwedge_{(\pi_1,\sigma_1)\in\Sigma_1(m)}\bigwedge_{(\pi_2,\sigma_2)\in\Sigma_2(m)}\pi_1\wedge\pi_2\Longrightarrow\sigma_1=\sigma_2$$

The processor 110 may unify names of symbolic values of respective method parameters into the same name. For example, the processor 110 may use a consistent symbol such as $\alpha_m$ for a method m.

The processor 110 may decide that the patch program is correct when the method summary table of the original program and the method summary table of the patch program match each other.

An experimental example of comparing performances of the technology NPEX of repairing the null pointer exception (NPE) using the computing device according to some exemplary embodiments of the present disclosure and the technologies in the related art will be described later.

According to the experimental example, as comparison target technologies, VFix and Genesis which are two latest technologies among known technologies of repairing Java NPE are selected. It is known that VFix as the latest NPE repairing technology has the most excellent performance among the existing NPE repairing technologies. Genesis may be a data based technology. For example, Genesis may be a technology that trains a patch generation strategy from patches of a person. It is known that Genesis shows a good performance by training a patch generation strategy specialized to NPE. Therefore, additionally, NPEX$_{Base}$ is set as a self comparison group. In the case of the comparison group, the patch generation strategy is fully the same as the technology NPEX of the present disclosure, but only validating the patch with the testcase created by the developer may be different. Since the performance of the error automatic repairing technology may significantly depend on the patch generation strategy, the error automatic repairing technology is set in order to confirm the effectiveness of the error repairing specification inference and patch validation technology which is the core of the present disclosure.

In an open source project, 119 bugs in which a history of actually repairing the error by the developer exists are collected. A benchmark may be configured as follows. VFixBM may have 30 NPE errors, GenBM may have 16 NPE errors, BearsBM may have 14 NPE errors, and OurBM may have 59 NPE errors. Here, in the case of VFixBM, GenBM, and BearsBM, benchmarks are adopted which used as the existing technology evaluation, respectively, and OurBM is directly collected in order to evaluate the technology of the present disclosure.

In respect to an experimental environment, an experiment is conducted on a Ubuntu 18.04 system in which a 128-GB memory is installed on an Intel Xeon Gold 6230 processor.

In respect to an experimental setting, an input in which the NPE occurs is given with respect to each tool in the form of the testcase. Additionally, all technologies (including NPEX$_{Base}$) except for the technology of the present disclosure give a test suit created by the developer for patch validation. A process of distinguishing whether patches finally output by respective technologies are semantically the same as the patches created by the developer. In the case of VFix, a test execution routine should be created directly instead of a general testing framework (e.g., JUnit), and due to difficulty of such a process, some benchmarks are excluded from an evaluation target in the case of VFix.

An error repairing performance evaluation result for 119 NPE errors is shown in Table 2 below.

TABLE 2

| Benchmarks | | NPEX | | | | | $NPEX_{base}$ | | | | |
|---|---|---|---|---|---|---|---|---|---|---|---|
| Name | #Bug | #R | #G | #C | Prec | FixR | #R | #G | #C | Prec | FixR |
| VFIXBM | 30 | 30 | 28 | 19 | 68% | 63% | 30 | 30 | 6 | 20% | 20% |
| GENBM | 16 | 16 | 16 | 10 | 63% | 63% | 16 | 14 | 3 | 21% | 19% |
| BEARSBM | 14 | 14 | 11 | 6 | 55% | 43% | 14 | 10 | 3 | 30% | 21% |
| OURBM | 59 | 59 | 44 | 26 | 59% | 44% | 59 | 47 | 16 | 34% | 27% |
| Total | 119 | 119 | 99 | 61 | 62% | 51% | 119 | 101 | 28 | 28% | 24% |
| Benchmarks | | GENESIS [36] | | | | | VFix [67] | | | | |
| Name | #Bug | #R | #G | #C | Prec | FixR | #R | #G | #C | Prec | FixR |
| VFIXBM | 30 | 0 | n/a | n/a | n/a | n/a | 30 | 26 | 20 | 77% | 67% |
| GENBM | 16 | 16 | 11 | 8 | 73% | 50% | 2 | 2 | 1 | 50% | 50% |
| BEARSBM | 14 | 14 | 9 | 3 | 33% | 21% | 2 | 1 | 0 | 0% | 0% |
| OURBM | 59 | 59 | 33 | 9 | 27% | 15% | 23 | 15 | 3 | 20% | 13% |
| Total | 119 | 89 | 53 | 20 | 38% | 22% | 57 | 44 | 24 | 55% | 42% |

In the table, #R may mean the number of bugs for which each tool operates. #G and #C may mean the number of errors which succeed in patch generation and the number of bugs which generate a correct patch, respectively. Since the error repairing specification may be incomplete, the patch passes through the testcase or a patch validation process of the technology according to the present disclosure, but a wrong patch may be actually generated, which is different from a semantic of the developer patch. Prec(#C/#G) as an index indicating the accuracy of the technology may mean how many correct patches exist as compared with the case of succeeding in the patch generation. FixR(#C/#R) as an index indicating an error repairing success rate of the technology may mean for how many errors the correct patch is generated. As an experimental result, it can be seen that the technology according to the present disclosure shows the most excellent performance as compared with the existing technology in all terms including the accuracy (62%) and the error repairing success rate (51%). In particular, the technology according to the present disclosure shows a superior performance as compared with NPEXBase set as the comparison group, and this may suggest that the error repairing specification inference and validation technology which is the core of the present disclosure is effective for actually repairing the Java NPE error.

FIG. 2 is a schematic view illustrating a network function according to an exemplary embodiment of the present disclosure.

In the present disclosure, the classification model may correspond to the artificial intelligence-based model. In an additional exemplary embodiment of the present disclosure, the artificial intelligence-based model may be used for obtaining the replacement expression replacing the NPE occurrence expression causing the null pointer exception included in the input program.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

FIG. 3 is a diagram for describing a training process of a classification model performed by the computing device for repairing a null pointer exception according to some exemplary embodiments of the present disclosure.

Referring to FIG. 3, the processor 110 may obtain a null processing pattern dataset 20 from at least one program 10.

At least one program 10 may be a file including data related to a language which may be recognized by the computing device. For example, at least one program 10 may be a java program. In the present disclosure, for convenience of description, at least one program 10 may be described by assuming that at least one program 10 is the java program. However, the type of at least one program 10 is not limited thereto and may include various types of programs.

At least one program 10 may be stored in a memory 130 in advance according to an exemplary embodiment. At least one program may be received from an external device according to another exemplary embodiment.

The null processing pattern dataset may be a set of tuples. For example, the null processing pattern dataset may include a first program included in at least one program, a first feature vector converting a first NPE occurrence expression causing the null pointer exception in the first program into a vector, and a first specialization replacement expression used instead of the first NPE occurrence expression in order to prevent the occurrence of the null pointer exception.

The processor 110 may train a classification model 30 in advance by using the null processing pattern dataset 20 obtained from at least one program 10.

For example, the processor 110 may train the classification model 30 through deep learning or machine learning by using the null processing pattern dataset 20 so as to obtain a replacement expression which replaces the NPE occurrence expression causing the null pointer exception included in the input program.

Specific contents regarding the components (e.g., the computing device 100, at least one program 10, the null processing pattern dataset 20, the classification model 30, etc.) disclosed in FIG. 3 may be replaced with the contents described through FIGS. 1 and 2 above.

FIG. 4 is a diagram for describing a patch program creation process using the classification model performed by the computing device for repairing a null pointer exception according to some exemplary embodiments of the present disclosure.

Referring to FIG. 4, the processor 110 may obtain a patch program 50 acquired by repairing an error of an original program 40 from the original program 40 by using the classification model 30. For example, the processor 110 inputs the original program 40 into the classification model 30 to output the patch program 50 from the classification model 30.

The original program 40 may be a program with the error. For example, the original program 40 may be an error program. The error may include the null pointer exception.

The patch program 50 may be a program acquired by repairing the error of the original program. For example, the patch program 50 may be a program acquired by repairing the error by replacing the null pointer exception included in the original program with a replacement expression.

Specific contents regarding the components (e.g., the computing device 100, the classification model 30, the original program 40, the patch program 50, etc.) disclosed in FIG. 4 may be replaced with the contents described through FIGS. 1 to 3 above.

FIG. 5 is a diagram for describing a method for repairing a null pointer exception performed by the computing device according to some exemplary embodiments of the present disclosure.

Referring to FIG. 5, the processor 110 may obtain an original program (S110).

The processor 110 may obtain a patch program acquired by repairing an error of an original program from the original program by using the classification model (S120).

The classification model may be trained in advance by using a null processing pattern dataset obtained from at least one program.

The null processing pattern dataset may include a first program included in at least one program, a first feature vector converting a first NPE occurrence expression causing the null pointer exception in the first program into a vector, and a first specialization replacement expression used instead of the first NPE occurrence expression in order to prevent the occurrence of the null pointer exception.

The first specialization replacement expression may be obtained from a first abstract replacement expression by using the specialization function of specializing the type of expression to correspond to the classification model.

The first abstract replacement expression may be obtained from a first original replacement expression including at least one information regarding the first program and the replacement expression preventing the occurrence of the null pointer exception by using the abstract function abstracting at least one information regarding the first program.

The first feature vector may be decided based on at least one of a method name, a method body, or a context related to the first NPE occurrence expression.

The null pointer exception may be a bug that may cause forced termination of the program by referring to the null pointer which is a pointer indicating that there is not data element to be referred to.

The classification model may be trained in advance through deep learning or machine learning by using the null processing pattern dataset in order to obtain the replacement expression replacing the NPE occurrence expression causing the null pointer exception included in the input program.

The processor 110 compares the original program and the patch program to validate the patch program.

Steps illustrated in FIG. 5 are exemplary steps. Therefore, it will also be apparent to those skilled in the art that some of the steps of FIG. 5 may be omitted or there may be additional steps within a range without departing from a spirit scope of the present disclosure. Further, specific contents regarding the components (e.g., the computing device 100, etc.) disclosed in FIG. 5 may be replaced with the contents described through FIGS. 1 to 4 above.

The computing device 100 according to some exemplary embodiments of the present disclosure may achieve electronic automation of Java null pointer exception error debugging. The existing automatic debugging technology just automatically detects the error or can repair the error only when receiving a testcase manually created by the developer as an input. The computing device 100 according to some exemplary embodiments of the present disclosure automatically infers the error repairing specification to enable automatic repairing immediately after discovering the error, and as a result, an entire debugging process can be completely automated.

The testcase based validation scheme has a limit that only a specification for a finite input can be intrinsically described. The computing device 100 according to some exemplary embodiments of the present disclosure can contribute to solving a testcase bias problem. The error repairing specification inferred through the computing device 100 according to some exemplary embodiments of the present disclosure abstracts the input of the program with symbols, and follows a logic formula form constituted by the symbols, so specification is enabled for a more general input.

FIG. 6 is a simple and normal schematic view of an exemplary computing environment in which the exemplary embodiments of the present disclosure may be implemented. It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

What is claimed is:

1. A method for repairing a null pointer exception performed by a computing device including a processor, the method comprising:
    obtaining an original program; and
    obtaining, by using a classification model, a patch program from the original program acquired by repairing an error of the original program,
    wherein the classification model is trained in advance by using a null processing pattern dataset obtained from at least one program.

2. The method of claim 1, wherein the null processing pattern dataset includes
    a first program included in at least one program,
    a first feature vector converting a first NPE occurrence expression causing the null pointer exception in the first program into a vector, and
    a first specialization replacement expression used instead of the first NPE occurrence expression in order to prevent the occurrence of the null pointer exception.

3. The method of claim 2, wherein the first specialization replacement expression is obtained from a first abstract replacement expression by using the specialization function of specializing the type of expression to correspond to the classification model.

4. The method of claim 3, wherein the first abstract replacement expression is obtained from a first original replacement expression including at least one information regarding the first program and the replacement expression preventing the occurrence of the null pointer exception by using the abstract function abstracting at least one information regarding the first program.

5. The method of claim 2, wherein the first feature vector is decided based on at least one of a method name, a method body, or a context related to the first NPE occurrence expression.

6. The method of claim 2, wherein the null pointer exception is a bug that may cause forced termination of the program by referring to the null pointer which is a pointer indicating that there is no data element to be referred to.

7. The method of claim 1, wherein the classification model is trained in advance through deep learning or machine learning by using the null processing pattern dataset in order to obtain the replacement expression replacing the NPE occurrence expression causing the null pointer exception included in the input program.

8. The method of claim 1, further comprising:
    performing a validation of the patch program by comparing the original program and the patch program.

9. A non-transitory computer-readable medium storing instructions that, when executed by one or more processors, cause the one or more processors to perform operations comprising:
    obtaining an original program; and
    obtaining, by using a classification model, a patch program from the original program by repairing an error of the original program; and,
    wherein the classification model is trained in advance by using a null processing pattern dataset obtained from at least one program.

10. A computing device for repairing a null pointer exception, comprising:
- a processor including at least one core;
- a memory for storing computer programs executable by the processor; and
- a network unit,
- wherein the processor is configured to obtain an original program, and
- obtain, by using a classification model, a patch program from the original program by repairing an error of the original program and,
- wherein the classification model is trained in advance by using a null processing pattern dataset obtained from at least one program.

* * * * *